United States Patent [19]

Rehm

[11] Patent Number: 5,656,908
[45] Date of Patent: Aug. 12, 1997

[54] NEGATIVE COEFFICIENT FILTER FOR USE WITH AC MOTORS

[75] Inventor: Thomas J. Rehm, Mequon, Wis.

[73] Assignee: Allen-Bradley Company, Inc., Milwaukee, Wis.

[21] Appl. No.: 453,297

[22] Filed: May 30, 1995

[51] Int. Cl.$^6$ ............................................. G05B 1/02
[52] U.S. Cl. ...................... 318/608; 318/615; 318/632; 388/813
[58] Field of Search ...................... 318/609, 610, 318/561, 650, 602, 603, 632, 615, 601, 600, 608; 323/282, 283; 388/805, 813, 812

[56] References Cited

U.S. PATENT DOCUMENTS

| | | | |
|---|---|---|---|
| 5,493,192 | 2/1996 | Nihei et al. | 318/610 |
| 5,495,158 | 2/1996 | Schmidt et al. | 318/561 |
| 5,514,947 | 5/1996 | Berg | 323/282 |
| 5,545,957 | 8/1996 | Kubo et al. | 318/650 |

*Primary Examiner*—John W. Cabeca
*Attorney, Agent, or Firm*—Michael A. Jaskolski; John M. Miller; John J. Horn

[57] ABSTRACT

A method and apparatus to be used with the motor controller for reducing phase shift between the feedback signal and the correction signal. Wherein the feedback signal is compared by the controller to a reference signal to provide the correction signal used to alter motor control signals. The method includes changing a correction signal according to a transfer function to produce a filter signal wherein the transfer function includes two variables: $k_n$ and $\omega_n$. $\omega_n$ always being greater than zero, and $k_n$ being negative when the feedback signal is phased shifted into a medium frequency range. The method and apparatus produce filtered signals that are phase shifted and amounts determined by the $k_n$ and $\omega_n$ variables. Where $k_n$ is negative, the filtered signal is phase lagged by an extreme degree.

20 Claims, 2 Drawing Sheets

NEGATIVE COEFFICIENT FILTER FOR USE WITH AC MOTORS

FIELD OF THE INVENTION

The present invention relates to systems for controlling electric motors and, more particularly, to a system for correcting for phase shift in signals propagating through a motor control system.

DESCRIPTION OF THE ART

Induction motors commonly include a rotor and a stator, the rotor positioned within a cylindrical stator frame and including a plurality of rotor windings equispaced about an external wall. An internal surface of the stator frame forms longitudinally running winding slots which receive stator windings. In this type of motor, each stator winding is connected to an AC voltage source by a separate line, the source generating an alternating current therein.

As the stator currents alternate, a wave of magnetic field flux, directed radially toward the rotor, rotates around the axis of the rotor. The relative motion between the stator flux wave and the rotor windings induces an alternating voltage and current in each of the rotor windings. The alternating rotor currents, in turn, produce a magnetic rotor flux directed outwardly toward the stator. Because of the interaction between the flux fields, the rotor encounters a force tending to rotate the rotor as the stator currents alternate. A shaft connected to the rotor rotates therewith, a distal end of the shaft being connected to a load.

Typically a motor controller is used to control motor and shaft speed. Ideally, the controller receives a reference velocity signal and produces signals which provide currents in the stator windings that impart a torque to the rotor for rotating the rotor at the reference velocity.

In reality, however, various motor parameters change during operation so that the relationship between voltages provided across stator windings and the speed at which the rotor rotates is not linear. As a result, identical voltages across the stator windings may drive the rotor at different velocities at different instances depending upon the instantaneous states of various motor parameters.

For example, as current flows through stator and rotor windings the temperature of both rotor and stator windings increases. As winding temperature changes, winding resistance changes which in turn affects the stator winding currents. This alters the stator-rotor torque relationship which finally affects shaft speed.

Because of fluctuating motor parameters, where precise shaft velocity is required, a feedback loop is often used to monitor motor velocity. The controller uses feedback information to determine how the stator winding voltages must be altered to compensate for unexpected system parameters, and then, ideally, adjusts control signals accordingly to ensure stator winding voltages that drive the motor at the desired reference velocity. Where system parameter changes occur gradually, such as stator winding resistance due to gradual temperature fluctuation, a simple feedback loop is usually sufficient. However, where system parameters change quickly at high frequencies, often a simple feedback loop can exacerbate velocity control problems as the control system cannot instantaneously alter motor velocity as a function of feedback signals. One such quickly fluctuating motor parameter is torsional shaft rotation.

Upon starting a motor, when stator and rotor fields are produced and the stator field rotates about the rotor, the rotor experiences rotational torque. Nevertheless, the load still tends to remain stationary as the rotor begins to rotate. The shaft linking the rotor and load experiences a twisting force which effectively stresses the shaft into the direction of rotor rotation. The shaft operates as a torsional spring storing the energy of the twisting force. Once the rotor and load reach a substantially steady state speed, the energy of the twisting force is unloaded tending to sling the load around the axis of rotation to an increased velocity which is faster than the rotor velocity.

As the load is slung around, the shaft experiences a twisting force in the opposite direction, storing the energy of the force as an oppositely loaded torsional spring. This twisting force phenomenon continues to oscillate back and forth loading the shaft in one direction and then in the opposite direction. Each time the load is slung past the velocity of the rotor it imparts some velocity change to both the shaft and rotor. These velocity changes show up in the velocity feedback signal as a relatively high frequency resonating component so that the velocity feedback signal resonates about the desired reference velocity. The resonating frequency and extent of torsional shaft rotation are both functions of both motor design nuances and the load driven by the motor. Larger loads tend to have more momentum and hence spring back and forth at a slower rate (i.e., lower frequency).

Torsional shaft rotation is problematic for a number of reasons. First, this rotation results in noisy motor operation as fluctuating velocity vibrates both the load and the rotor. Second, and perhaps most importantly, as the load and shaft vibrate, the shaft often heats up to the point where the shaft and adjacent motor components may be either damaged or destroyed. Because the extend of torsional shaft rotation is a function of motor design nuances and load, it is extremely difficult to provide a solution to the problem that will work in all instances.

With feedback loops, the idea is to determine the error between desired and actual velocities and alter torque delivered to the motor in order to conform the actual velocity to the desired velocity. Hence, where the torsional force is instantaneously driving the shaft past the desired velocity in the clockwise direction, a torque in the counterclockwise direction of a magnitude equal to that of the torsional force can be provided. Unfortunately, processing delays inherent in all electronic feedback loops render simple feedback loops unable to compensate for velocity errors where high frequency resonance exists.

Most controllers include digital and/or analog control circuitry. Each controller calculation requires a finite amount of time to complete. The plurality of calculations required to generate control signals can often take a fraction of a second. This means that by the time a feedback signal is compared to a reference signal and a corrected torque signal propagates through the controller to adjust motor torque to compensate for a velocity error, the corrected motor torque is out of phase with the original velocity error (i.e., is later in time or "lags" the velocity error). Any correction based on a lagging motor torque can alter the instantaneous rotor velocity in an unintended manner, thus exacerbating the velocity error problem. While minimal lag is tolerable as the feedback loop can compensate for the majority of velocity error, excessive lag cannot be tolerated.

One way to correct for the phase shift in the correction signal is to provide delay means in the feedback loop to phase shift the corrected torque signal further. Because the resonant velocity error due to torsional shaft rotation is periodic, if the corrected motor torque is phase shifted sufficiently, the corrected motor torque corresponding to a velocity at a first instance can be used to correct a velocity error at a second instance approximately one-half period after the first instance. After additional phase shifting, if the feedback and correction signals are approximately 180° out of phase, the velocity error can be eliminated.

Delays have been provided by using analog capacitor-resistor networks in the feedback loop as known in the art. By providing adjustable value resistors, variable delay can be introduced into a circuit. While effective, the analog solution is relatively clumsy as it can require many adjustments to shift the corrected signal appropriately and such adjustments must be manually made by tweaking appropriate hardware.

A relatively effective way to correct for high frequency parameter changes such as torsional shaft rotation, is to employ an adjustable digital filter feedback loop that phase shifts the corrected motor torque in either the lagging or leading directions. By allowing filter parameters to be altered, the degree of phase shift can be changed somewhat to provide better damping characteristics. This type of system is advantageous over the analog solution because it is more versatile and parameters can be altered by way of software.

Unfortunately, adjustable digital filters have proven effective for only some degrees of phase shift while other degrees cannot be achieved without driving the controller into an unstable state. For example, most first order filters can only phase shift a correction signal or torque a maximum of approximately 40°, and that maximum can only be achieved under specific and ideal circumstances, the typical maximum being much less than 40°. Where controller phase shift is approximately 90°, even the maximum additional shift (i.e., 40°) results in a total shift of 130°, far less than the desired approximately 180°.

Where an adjustable filter cannot affect appropriate damping, analog damping systems must be specially designed to accommodate specific loads. This is extremely costly and time consuming.

Thus, it would be advantageous to have a filter that could compensate for phase lag in a feedback signal to account for phase shift due to controller signal propagation delay regardless of the degree of propagation delay.

SUMMARY OF THE INVENTION

The present invention includes a method to be used with a motor controller for reducing phase shift between a feedback signal and a correction signal. The feedback signal is compared by the controller to a reference signal to provide the correction signal used to alter motor control signals. The method comprises the steps of deriving a feedback signal, determining the degree of phase shift between the feedback signal and the correction signal, changing the correction signal according to a transfer function to produce a filtered signal, wherein the transfer function is the following function:

$$\frac{k_n s + \omega_n}{s + \omega_n} \quad (1)$$

where $k_n$ and $\omega_n$ are variables, $\omega_n$ is always greater than zero, and $k_n$ is negative when the correction signal was phase shifted into a medium frequency range between a small angle that is greater than 75° and a large angle that is less than 105°.

Hence, one object of the present invention is to provide a filter compensator which can phase lag a signal by a greater degree than other conventional filter mechanisms. Whereas other filter mechanisms typically only phase lag correction signals by a maximum of X degrees under ideal circumstances prior to driving a controller into an unstable state, the filter of the present invention can, under certain circumstances, phase lag a signal by at least 2×, twice as much, without causing an unstable condition. Hence, even where controller phase lag is approximately 90°, the present filter can promote additional lag so that the resulting cumulative lag approaches 180° and the time delay and resulting velocity error can be compensated for.

Preferably, the small angle is 85° and the large angle is 95°. Most preferably, the small angle is 88° and the large angle is 92°. In one embodiment, the step of changing the correction signal includes a step of multiplying the correction signal by the transfer function. In another embodiment, the step of changing the correction signal includes a step of multiplying the feedback signal by the transfer function. Thus, the present inventor has realized that the inventive filter can be used at any point in the feedback loop, including the feed forward portion, to compensate for controller time delay.

In a preferred embodiment, if the feedback signal is phase shifted less than the small angle, the correction signal is changed according to the transfer function to produce a filtered signal wherein $k_n$ is greater than 1. If the feedback signal is phase shifted past the large angle, the correction signal is changed to produce a filtered signal according to the transfer function wherein $k_n$ is greater than or equal to 0 and less than or equal to 1.

Thus, another object of the present invention is to provide a filter mechanism which can add phase lag or phase lead to a correction signal to compensate for any degree of phase lag between the correction signal and the feedback signal. By equating $k_n$ with a value greater than 1, phase lead can be provided. By equating $k_n$ with a value greater than or equal to 0 and less than or equal to 1, a lesser degree of phase lag can be provided for instances where controller phase lag is much greater than 90°.

Also, in a preferred embodiment, where the phase lag due to controller calculation time is within the medium range, the $k_n$ value is set equal to −1. By setting the $k_n$ value equal to −1 and appropriately adjusting the $\omega_n$ value, the filter of the present invention operates as a transport function which phase lags the correction signal appropriately without affecting the magnitude of that correction signal.

In addition to the method described above, the present invention also contemplates an apparatus which can be used with the method for motor control.

The foregoing and other objects and advantages of the present invention will appear from the following description. In the description, references made to the accompanying drawings which form a part hereof, and in which there is shown by way of illustration and preferred embodiment of the invention. Such embodiment does not necessarily represent the full scope of the invention, however, a reference is made therefore to the claims herein for interpreting the scope of the invention.

DETAIL DESCRIPTION OF THE EMBODIMENT

Figure 1:
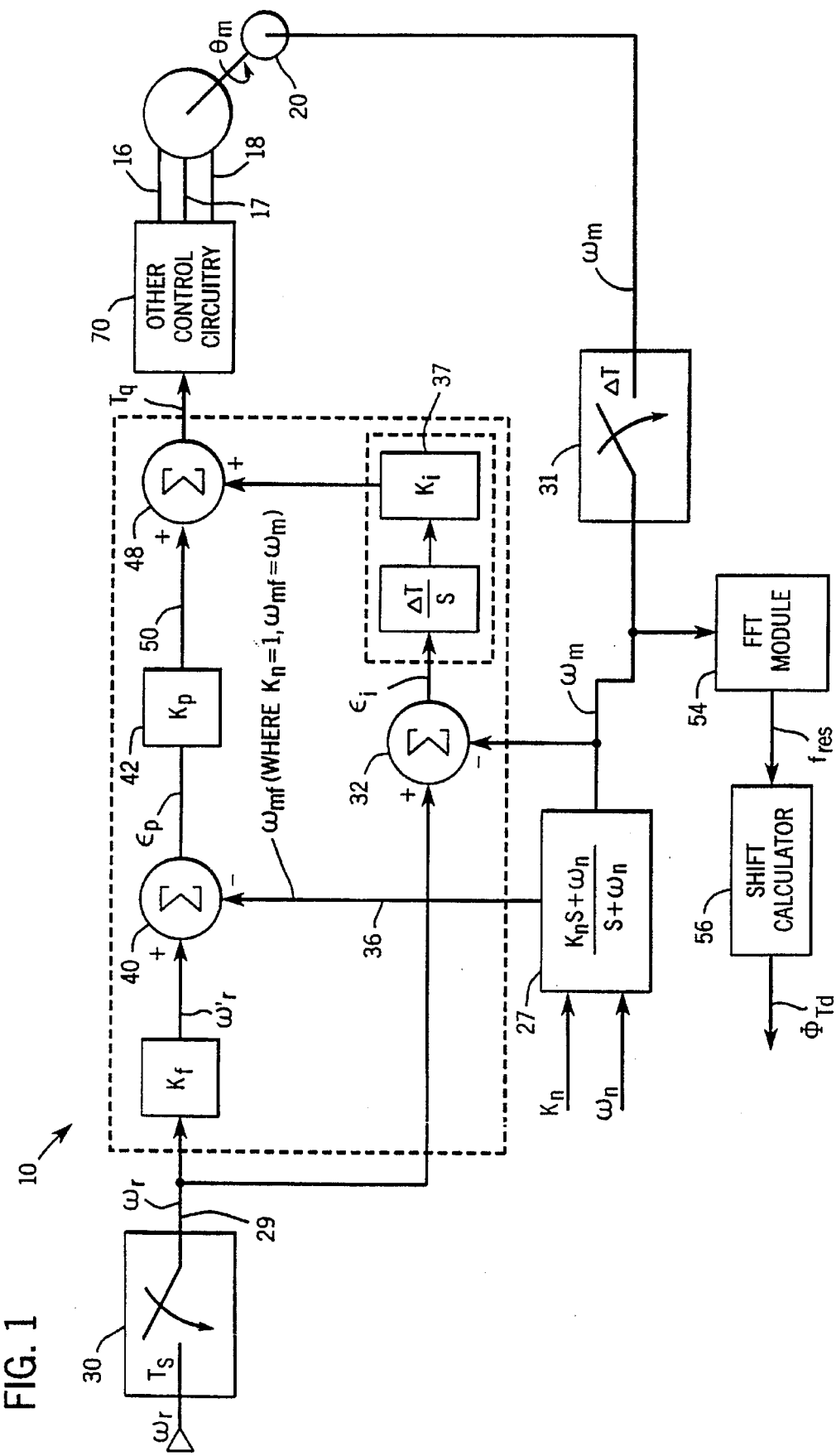
FIG. 1 is a schematic showing a motor controller including a feedback loop according to the present invention.

Referring to FIG. 1, the present invention will be described in the context of an exemplary control controller 10 for controlling an AC induction motor 12. The controller 10 receives a reference velocity signal $\omega_r$ and generates voltages on lines 16, 17, and 18 for exciting stator windings of the AC motor 12. The voltages in the stator windings produce currents which induce magnetic fields in the stator. Each of the three voltages is sinusoidal and the voltages are out of phase by 120° so that the currents alternate and the stator magnetic field rotates about the stator. When the stator magnetic fields rotate they induce current in the rotor windings and a rotor magnetic field that interacts with the rotating stator field. The interaction between fields provides a rotating torque to the motor which tends to rotate the rotor about a rotation axis at a motor velocity approximately equal to the reference velocity $\omega_r$. In order to ensure that the motor velocity $\omega_m$ is nearly identical to the reference velocity $\omega_r$, a feedback loop is provided.

The feedback loop includes an encoder 20 that detects the angular displacement $\theta_m$ of the rotor and produces a motor velocity signal $\omega_m$. The motor velocity signal $\omega_m$ passes through a digital sampler 31 and the filter 27 of the present invention, which is described in more detail below, to produce a filtered motor velocity signal $\omega_{mf}$ and digital motor velocity signal $\omega_m$ which are both provided to the controller 10. As well known in the art, the controller 10 is a proportional-integral (PI) controller. The controller 10 uses the digital sampler and filter and velocity signals $\omega_m$ and $\omega_{mf}$ to correct for differences between the actual motor velocity and the reference velocity $\omega_r$. At steady state, the reference velocity $\omega_r$ remains constant whereas the actual digital and filtered signals $\omega_m$, $\omega_{mf}$ may fluctuate about the reference velocity $\omega_r$ due to changing motor parameters.

Figure 2:
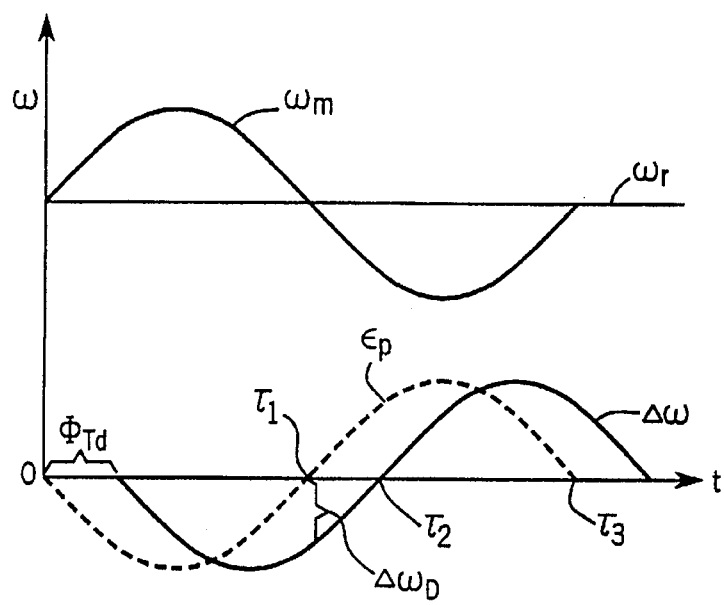
FIG. 2 is a graph illustrating signals at various points in the controller of FIG. 1.

For the purpose of explaining the problem solved by the invention, it will be assumed that the value of $k_n$ in the inventive filter 27 is 1 so that the filter transfer function reduces to 1 and the feedback loop is effectively filter free. Where this is the case, $\omega_{mf}=\omega_m$. Referring also to FIG. 2, a typical reference velocity signal $\omega_r$ and associated motor velocity signal $\omega_m$ can be observed. In FIG. 1, a digital sampler 30 receives the reference velocity signal $\omega_r$ and produces a digital reference signal which is provided to the PI controller 10 on line 29. When the controller 10 receives the reference and motor velocity signals $\omega_r$, $\omega_m$, each signal $\omega_r$, $\omega_m$ is supplied to both legs of the PI controller 10. In the proportional leg, the reference signal $\omega_r$ is stepped up by a constant $k_f$ producing a stepped up reference signal $\omega'_r$ that has a value suitable for calculations (i.e., suitable for comparison to the motor velocity signal $\omega_m$). Within the proportional leg, a summer 40 is used to subtract the motor velocity signal $\omega_m$ from the stepped up reference velocity signal $\omega_r$ to produce an error signal $\epsilon_p$. Similarly, in the integral leg, a second summer 32 is used to subtract the digital motor velocity signal $\omega_m$ from the digital reference signal $\omega_r$ to produce an error signal $\epsilon_i$.

The error signals $\epsilon_p$ and $\epsilon_i$ are provided to proportional and integral blocks 42, 37 respectively, which cooperate to increase the speed at which the controller 10 can alter motor velocity to eliminate velocity errors. Operation of the proportional and integral legs of the PI controller is well known in the art and hence will not be explained here in detail. The outputs from the proportional and integral blocks 42, 37 are added at a third summer 48 to produce a torque signal $T_q$ which is provided to other control circuitry 70 which in turn generates voltages on lines 16, 17, and 18. The voltages on lines 16, 17, and 18 alter torque delivered to the motor 12 and hence alter motor speed as a function of the torque signal $T_q$.

For the purposes of simplifying the description of this invention, a motor torque $T_m$ will be identified as the torque actually delivered to the motor 12 as a result of the torque signal $T_q$. The motor torque $T_m$ is not a directly generated value, but is rather the result of altered stator winding voltages as a function of the torque signal $T_q$ provided by the PI controller. The motor torque $T_m$ has a motor velocity altering effect which will be referred to herein as velocity correction $\Delta\omega$.

Upon starting a motor, a reference velocity signal $\omega_r$ is provided to the controller 10. Because the motor is initially at rest, the motor velocity signal $\omega_m$ is initially zero and both error signals $\epsilon_p$ and $\epsilon_i$ equal the reference velocity $\omega_r$. At start-up, the control circuitry 70 produces voltages and begins to accelerate the rotor. Over the course of a start-up period, the motor velocity $\omega_m$ increases until the motor velocity $\omega_m$ is equal to the reference velocity $\omega_r$, the error signals $\epsilon_p$ and $\epsilon_i$ are reduced to zero, and the voltages on lines 16, 17, and 18 reach a steady AC state.

During operation, however, as motor parameters change due to torsional shaft rotation or the like, the motor velocity $\omega_m$ fluctuates about the reference velocity $\omega_r$ so that the error signals $\epsilon_p$ and $\epsilon_i$ continuously hover around a zero value, being periodically positive and negative. These fluctuations result from torsional energy stored in the shaft that produces a torsional force that oscillates between the clockwise and counterclockwise directions about the shaft axis.

In correcting for these motor velocity deviations, the object is to provide torque in a direction which opposes and which compensates for the torsional force. Hence, when the torsional force is rotating the shaft in a clock-wise direction, an equal and opposite force in the counter clock-wise direction can be provided. Similarly, when the torsional force is acting in the counter clock-wise direction, a compensating force is provided in the clock-wise direction.

Ideally the control system would be able to instantaneously determine motor velocity deviations, alter the reference velocity signal $\omega_r$ to compensate for the velocity deviations, and produce correcting motor torque that would counter the torsional rotation forces resulting in a motor velocity $\omega_m$ equal to the reference velocity $\omega_r$.

In reality, however, after the motor velocity $\omega_m$ is sampled, the motor velocity signal $\omega_m$ is used in a plurality of complex calculations to generate a desired correcting torque signal $T_q$ and then to produce line voltages that will generate a compensating and correcting motor torque $T_m$ which results in the appropriate velocity correction $\Delta\omega$. While each calculation requires only a short period to complete, the cumulative time required to complete necessarily sequential calculations adds up to produce a delay $T_d$ between the time at which the motor velocity is sensed and the time at which the motor torque $T_m$ can be provided to correct for velocity deviations. The result is that compensating motor torque $T_m$ is often out of phase with the velocity errors that give rise to the compensating motor torque $T_m$ and hence the velocity correction $\Delta\omega$ is also out of phase. Where this is the case, compensating motor torque $T_m$ can exacerbate motor control problems.

This phase shifting only minimally effects the integral leg of the PI controller. Because the integral leg integrates deviations over a relatively long period, the effects of the periodic deviations integrated generally cancel each other. Hence, even though the motor torque $\omega_M$ and resulting correction due to the integral leg are out of phase, this correction does not appreciably affect high frequency velocity errors.

However, the phase shift between motor velocity measurement and the velocity correction Δω greatly affects output of the proportional leg which reacts to instantaneous high frequency velocity changes and hence greatly affects motor operation.

Referring still to FIG. 2, because of processing time required to produce the error signal $\epsilon_p$, the error signal $\epsilon_p$ itself would probably be out of phase slightly. Nevertheless, for the purpose of this description, it will be assumed that the error signal $\epsilon_p$ is in phase with the motor velocity. However, because of controller time delay $T_d$, the velocity correction Δω lags the motor velocity signal $\omega_m$ by a controller phase angle $\Phi_{Td}$. Where this is the case, there will be times when the motor torque $T_m$ and resulting velocity correction Δω tend to increase motor velocity where it is desired to decrease the velocity and vice versa.

For example, at $\tau_1$, where the error signal $\epsilon_p$ is equal to zero, because of the phase lag $\Phi_{Td}$, instead of generating zero motor torque $T_m$ and zero velocity correction Δω as desired, the velocity correction Δω will be $\Delta\omega_D$ which tends to slow the motor. Between times $\tau_1$ and $\tau_2$, the motor torque $T_m$ will continue to slow the motor even though, referring to the motor velocity signal $\omega_m$, clearly a motor torque $T_m$ and velocity correction Δω tending to increase motor velocity $\omega_m$ is desired. Between times $\tau_2$ and $\tau_3$, the velocity correction Δω is in the correct direction, tending to speed up the motor, however, it is of an imperfect amplitude because it is not symmetrical with the second portion of the motor velocity signal $\omega_m$.

When the motor velocity $\omega_m$ and velocity correction Δω are out of phase, the velocity correction Δω will partially correct for velocity errors during some portion of each one-half cycle of the motor velocity $\omega_m$ (i.e. between $\tau_2$ and $\tau_3$) and will exacerbate errors during the other portion (i.e. between $\tau_1$ and $\tau_2$). The degree to which the velocity correction Δω corrects is a function of the extent of phase lag between the motor velocity signal $\omega_m$ and the velocity correction Δω, and hence is a function of the controller time delay $T_d$.

Where the motor velocity signal $\omega_m$ is characterized by a relatively long period, a finite controller delay period $T_d$ may be relatively minimal. Where this is the case it may be desirable to use an unaltered motor torque $T_m$ to change motor velocity as the adverse effects of the delay will be relatively minimal. However, where the motor velocity signal $\omega_m$ is characterized by a short period, a finite controller delay period $T_d$ will be relatively large resulting in a large phase shift $\Phi_{Td}$ so that a velocity correction Δω adversely effects motor operation.

Because of the sequential nature of calculations required to generate the motor torque $T_m$ and produce a velocity correction Δω, the time delay $T_d$ for a specific controller cannot be appreciably altered. However, where the time delay $T_d$ for a specific controller is known and the frequency of the resonating motor velocity signal can be determined, the phase shift $\Phi_{Td}$ can be determined and additional phase shift, either leading or lagging, can be provided. In this manner, the motor torque $T_m$ and hence velocity correction Δω can be placed more in phase with the motor velocity signal $\omega_m$ to achieve better motor control.

Figure 3:
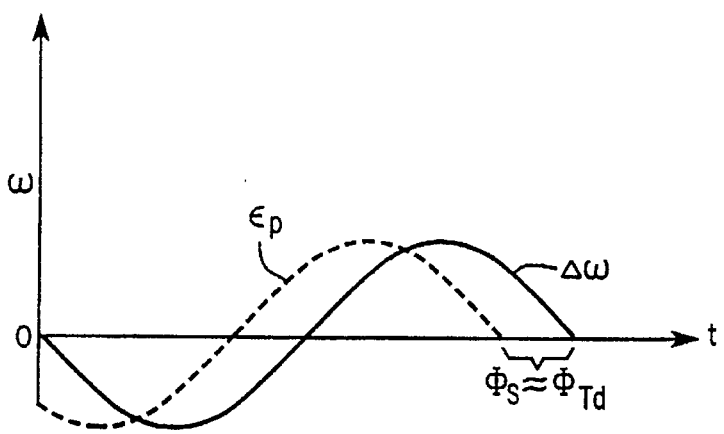
FIG. 3 is a graph similar to the graph of FIG. 2 illustrating phase lead compensation.

Referring still to FIG. 2, the controller phase lag is $\Phi_{Td}$. Referring also to FIG. 3, by adding phase lead $\Phi_s$ equal to the phase lag $\Phi_{Td}$ to the motor torque $T_m$, the resulting velocity correction Δω can be made more in phase with the motor velocity signal $\omega_m$ and hence can correct for velocity deviations.

Figure 4:
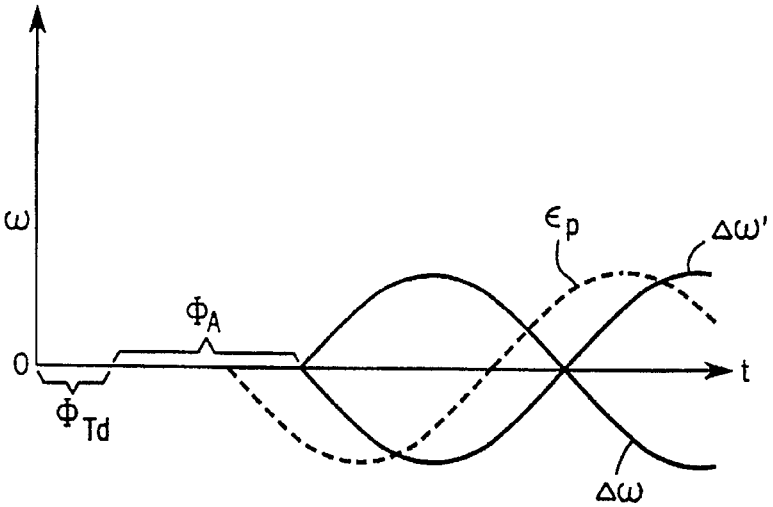
FIG. 4 is a graph similar to the graph of FIG. 2 illustrating phase lag compensation.

Another solution to the phase lag problem is to phase lag the velocity correction Δω so that when the additional phase lag $\Phi_A$ is added to the controller phase lag $\Phi_{Td}$, the total lag approaches 180°. In FIG. 4, the velocity correction Δω is phase lagged by $\Phi_A$ where $\Phi_A$ is approximately 180°–$\Phi_{Td}$. If the resulting velocity correction Δω (which is approximately 180° out of phase with the motor velocity signal $\omega_m$) is inverted to produce inverted velocity correction Δω', the velocity correction Δω' is in phase with the motor velocity signal $\omega_m$.

Unfortunately, often when a signal is phase lagged using a digital filter, the resulting signal amplitude is also affected. In other words, digital filters generally do not operate as pure transport mechanisms in either the phase lag or lead directions. The degree of amplitude alteration is typically a function of the extent of phase lag or lead produced by the filter. Hence, under certain circumstances, for example, where controller produced lag is minimal (i.e.<20%), the velocity correction Δω is sufficiently in phase with the motor velocity signal that it can correct for velocity fluctuations and therefore no filtering is required.

Where phase lag due to a time delay $T_d$ is substantial yet relatively minimal (i.e. between 20° and 85°), phase lead techniques are preferable to phase lag because the signals need only be shifted through a relatively small angle in order to achieve acceptable control. For example, where controller phase lag is approximately 60 degrees, by adding phase lead of 30 degrees, the velocity correction Δω can be brought into an acceptable phase relationship with the motor velocity $\omega_m$ without substantially altering the amplitude of the velocity correction Δω. Similarly, where phase lag is relatively large (i.e., between 95° and 160°), phase lag techniques are preferable.

Referring again to FIGS. 1 and 2, in order to determine the degree of phase lag $\Phi_{Td}$ and hence how a velocity correction Δω must be shifted to correct for velocity errors, a resonating frequency $f_{res}$ of the motor velocity signal $\omega_m$ must be determined. To this end, the digital motor velocity signal $\omega_m$ can be provided to a fast fourier transform (FFT) module 54 which performs an FFT on the digital signal $\omega_m$ to produce the resonating frequency signal $f_{res}$. The phase lag can be determined from the resonating frequency $f_{res}$ and the time delay $T_d$ according to the following equation:

$$\Phi_{Td}=2\pi f_{res}\cdot T_d=\omega_{res}\cdot T_d \qquad (2)$$

where $\Phi_{Td}$ is the phase shift due to the controller time delay $T_d$ and $\omega_{res}$ is the resonating velocity in radians. From equation 2 it can be observed that the phase shift $\Phi_{Td}$ increases where either the time delay $T_d$ or the resonating frequency $f_{res}$ increases. The frequency signal $f_{res}$ is supplied to a shift calculator 56 which calculates the phase shift $\Phi_{Td}$ between the motor velocity signal $\omega_m$ and the velocity correction Δω according to Equation 2. The phase shift $\Phi_{Td}$ is output to an operator by a digital readout or the like (not shown). Once controller phase lag $\Phi_{Td}$ is determined, an operator can determine how the motor torque $T_m$ and velocity correction should be shifted according to the principles identified above.

Referring again to FIG. 1, the filter according to the present invention implements the transfer function of Equation 1 where $k_n$ and $\omega_n$ are constants, $\omega_n$ is always positive, and $k_n$ can be positive, zero, or negative, depending upon the required lag or lead compensation. Both $k_n$ and $\omega_n$ are input by an operator using a keypad or the like (not shown) as a function of both phase shift $\Phi_{Td}$ and the additional phase shift $\Phi_A$ required to shift the velocity correction $\Delta\omega$ into acceptable orientation with respect to the motor velocity $\omega_m$.

Given the filter transfer function as expressed in Equation 2, it has been determined that there are four different categories of values that can be used for $k_n$, each of which affects phase shift in a different manner.

The effect of $k_n$

Referring to again Equation 1, by dividing the numerator by the denominator to provide the first three terms in a series, equation 1 can be represented as:

$$1 + \frac{(k_n-1)}{\omega_n} s - \frac{(k_n-1)}{\omega_n^2} s^2 + \ldots \qquad (3)$$

If a time delay is small, it is possible to approximate the time delay transfer function by the truncated power series:

$$e^{-sTd} = 1 - sT_{dA} + \frac{s^2 T_{dA}^2}{2} - \ldots \qquad (4)$$

Equations 3 and 4 are of similar forms, but the third terms are different and hence the two equations are not completely comparable. However, because the first two terms in each equation dominate the solution of each equation, what is known about one equation can be used to understand some general characteristics of the other equation. For example, by setting the time delay $T_{dA}$ from Equation 4 equal to the similar term in Equation 3, Equation 5 can be derived:

$$T_{dA} = \frac{1-k_n}{\omega_n} \qquad (5)$$

Equation 5 can be used to establish how different $k_n$ values generally affect phase shift and time delay.

For example, where $k_n$ is greater than 1, the added time delay $T_{dA}$ will be negative, despite the magnitude of $\omega_n$. An negative time delay $T_{dA}$ indicates phase lead added to a system. Similarly, where $k_n$ is greater than or equal to zero and less than 1, the time delay $T_{dA}$ will be positive indicating that a phase lag is being added to the system. Where $k_n$ is 1, the time delay $T_{dA}$ is zero and hence, at this limiting condition, no phase shift is introduced into the system.

Importantly, for the purposes of the present invention, it has been determined that extreme phase lag, greater than that which can be realized by using other filter systems, can be generated by setting $k_n$ equal to a negative value. For example, the greatest amount of phase lag that can be generated using any non-negative value of $k_n$ is $1/\omega_n$ where $k_n$ is equal to zero (this is a limiting case at which $\omega_n$ is defined to be a low pass filter bandwidth). By setting $k_n$ equal to negative 2, the time delay lag $T_{dA}$ can potentially be increased three fold to $3/\omega_n$. By setting $k_n$ equal to negative 4, the time delay lag $T_{dA}$ can potentially be increased five fold to $5/\omega_n$.

In addition, while negative $k_n$ values result in large phase lags, phase lags produced with negative $k_n$ values alter velocity correction $\Delta\omega$ amplitudes relatively less than lags provided with positive $k_n$ values. Hence, more lag can be introduced with less amplitude variation.

It should be noted that these figures correspond to Equation 5 which, as already indicated, is not entirely accurate but is only an approximation of the time delay $T_{dA}$. Nevertheless, these figures give some indication of what can be expected by setting $k_n$ equal to certain values. In addition, these forms generally conform to experiments wherein different values of $k_n$ have been used to alter phase shift.

Referring again to Equation 3, in the special circumstance where $k_n$ is equal to negative 1, at least the first three terms of Equations 3 and 4 assume identical form. In this case, setting $k_n$ equal to negative 1 in Equation 5, an extremely precise value of time delay $T_{dA}$ can be expressed as:

$$T_{dA} = 2/\omega_n \qquad (6)$$

Where a large phase lag must be added to a system $k_n$ can be set equal to negative 1 and $\omega_n$ can be adjusted accordingly to provide desired phase lag. Where $kn=-1$, the transfer function of Equation 1 represents a pure time transport and very little amplitude variation takes place as a result of the lag.

In situations calling for additional phase lag, the object is to add an amount of phase lag $\Phi_A$ to the system that approximately compliments the controller produced phase lag $\Phi_{Td}$ (i.e. the phase shift $\Phi_{Td}$ from the time delay $T_d$ and added shift $\Phi_A$ due to the added time delay $T_{dA}$ should be approximately equal to or greater than $\pi$ radians or 180 degrees). The amount of added phase lag $\Phi_A$ resulting from added time delay $T_{dA}$ can be determined according to the following equation:

$$\Phi_A = 2\pi f_{res} \cdot T_{DA} = \omega_{res} \cdot T_{dA} \qquad (7)$$

Combining Equations 6 and 7 and solving for $\omega_n$:

$$\omega_n = \frac{2\omega_{res}}{\Phi_A} \qquad (8)$$

Because the phase shifts should total approximately 180 degrees, $\Phi_A$ is equal to (28.64 rad. $-\Phi_{Td}$) and therefore:

$$\omega_n = \frac{2\omega_{res}}{\pi\,\text{rad.} - \Phi_{Td}} \qquad (9)$$

Combining Equations 2 and 9 and simplifying:

$$\omega_n = \frac{2\omega_{res}}{(\pi\,\text{rad.} - T_d \omega_{res})} \qquad (10)$$

Thus, where $\Phi_{Td}$ from Equation 2 is within the problem zone between 85 and 95 degrees, $k_n$ can be set to negative one and an approximate value of $\omega_n$ can be determined from Equation 10 as $\omega_{res}$ and the controller time delay $T_d$ are both known. While $\omega_n$ from Equation 10 should be substantially correct, due to some inevitable amplitude variation in the velocity correction $\Delta\omega$ caused by the phase shift, the value of $\omega_n$ may have to be fine tuned to achieve the best possible balance between additional phase shift $\Phi_A$ and amplitude variation. This can easily be achieved by the controller Operator.

While the above description details various elements of an apparatus including the filter according to the present invention, it should be understood that all of the elements, including the filter, are meant to be implemented in softwares, computer programs, and represent algorithms for execution by conventional-type digital processors adapted for industrial applications such as a model 8196 microelectronic processor that is supplied by INTEL Corporation of Santa Clara, Calif.

It should be understood that the methods and apparatuses described above are only exemplary and do not limit the scope of the invention, and that various modifications could be made by those skilled in the art that would fall under the scope of the invention. To apprise the public of the scope of this invention, we make the following claims:

I claim:

1. A method to be used with a motor controller for reducing phase shift between a feedback signal and a correction signal, the feedback signal compared by the controller to a reference signal to provide the correction signal used to alter motor control signals, the method comprising the steps of:

deriving a feedback signal;

determining the degree of phase shift between the feedback signal and the correction signal;

changing the correction signal according to a transfer function to produce a filtered signal, wherein the transfer function is the following function:

$$\frac{k_n s + \omega_n}{s + \omega_n}$$

where $k_n$ is a filter gain coefficient and $\omega_n$ is a filter cutoff frequency, $\omega_n$ is always greater than zero, and $k_n$ is negative when the feedback signal is phase shifted into a medium frequency range between a small angle that is greater than 75 degrees and a large angle that is less than 105 degrees.

2. The method as recited in claim 1 wherein the small angle is 85 degrees and the large angle is 95 degrees.

3. The method as recited in claim 1 wherein the small angle is 88 degrees and the large angle is 92 degrees.

4. The method as recited in claim 1 wherein the step of changing the correction signal includes the step of multiplying the correction signal by the transfer function.

5. The method as recited in claim 1 wherein the step of changing the correction signal includes the step of multiplying the feedback signal by the transfer function.

6. The method as recited in claim 1 further including the steps of:

if the feedback signal is phase shifted less than the small angle, changing the correction signal according to the transfer function to produce a filtered signal wherein $k_n$ is greater than one; and if the feedback signal is phase shifted past the large angle, changing the correction signal to produce a filtered signal according to the transfer function wherein $k_n$ greater than or equal to zero and less than or equal to one.

7. The method as recited in claim 1 wherein the controller introduces a known time delay into the correction signal and a periodic resonating signal is included in the feedback signal and the step of determining a phase shift includes the steps of:

(a) determining the frequency of the periodic resonating signal; and (b) mathematically combining the periodic resonating signal and the time delay signal to determine the phase shift.

8. The method as recited in claim 7 wherein the step of mathematically combining includes the step of multiplying the periodic resonating signal by the time delay signal to determine the phase shift in radians.

9. The method as recited in claim 1 wherein $k_n$ is negative 1.

10. The method as recited in claim 7 wherein $k_n$ is negative and:

$$\omega_n \leq \frac{2 \omega_{res}}{\pi \text{ rad.} - T_d \omega_{res}}$$

where $\omega_{res}$ is the resonating frequency in radians and $T_d$ is a time delay introduced into the correction signal by the controller.

11. An apparatus to be used with a motor controller for reducing phase shift between a feedback signal and a correction signal, the feedback signal compared by the controller to a reference signal to provide the correction signal used to adjust motor control signals, the apparatus comprising:

a sensor for deriving a feedback signal;

a calculator for determining the degree of phase shift between the feedback signal and the correction signal;

a filter changing the correction signal according to a transfer function to produce a filtered signal, wherein the transfer function is the following function:

$$\frac{k_n s + \omega_n}{s + \omega_n}$$

where $k_n$ is a filter gain coefficient, and $\omega_n$ is a filter cutoff frequency provided to the filter and wherein $\omega_n$ is always greater than zero and $k_n$ is less than zero when the feedback signal is phase shifted into a medium frequency range, the medium frequency range between a small angle that is greater than 75 degrees and a large angle that is less than 105 degrees, the filter producing a filtered signal; and an invertor for inverting the filtered signal to produce an inverted signal.

12. The apparatus as recited in claim 11 wherein the small angle is 85 degrees and the large angle is 95 degrees.

13. The apparatus as recited in claim 11 wherein the small angle is 88 degrees and the large angle is 92 degrees.

14. The apparatus as recited in claim 11 wherein the filter includes a multiplier that changes the correction signal by multiplying the correction signal by the transfer function.

15. The apparatus as recited in claim 11 wherein the filter includes a multiplier that changes the correction signal by multiplying the filter signal by the transfer function.

16. The apparatus as recited in claim 11 wherein:

if the feedback Signal is phase shifted less than the small angle, the filter changes the correction signal according to the transfer function to produce a filtered signal wherein $k_n$ is greater than one; and if the feedback signal is phase shifted past the large angle, the filter changes the correction signal to produce a filtered signal according to the transfer function wherein $k_n$ greater than or equal to zero and less than or equal to one.

17. The apparatus as recited in claim 11 wherein the controller introduces a known time delay into the correction signal and a periodic resonating signal is included in the feedback signal and the calculator includes a frequency sensor to determine the frequency of the periodic resonating signal and a combining means for mathematically combining the resonating signal frequency and the time delay signal to determine the phase shift.

18. The apparatus as recited in claim 17 wherein the combining means includes a multiplier for multiplying the resonating signal frequency by the time delay signal to determine the phase shift in radians.

19. The apparatus as recited in claim 11 wherein $k_n$ is negative 1.

20. The apparatus as recited in claim 17 wherein:

$$\omega_n \leq \frac{2 \omega_{res}}{\pi \text{ rad.} - T_d \omega_{res}}$$

where $\omega_{res}$ is the resonating frequency in radians and Td is a time delay introduced into the correction signal by the controller.

* * * * *